Figure 1:
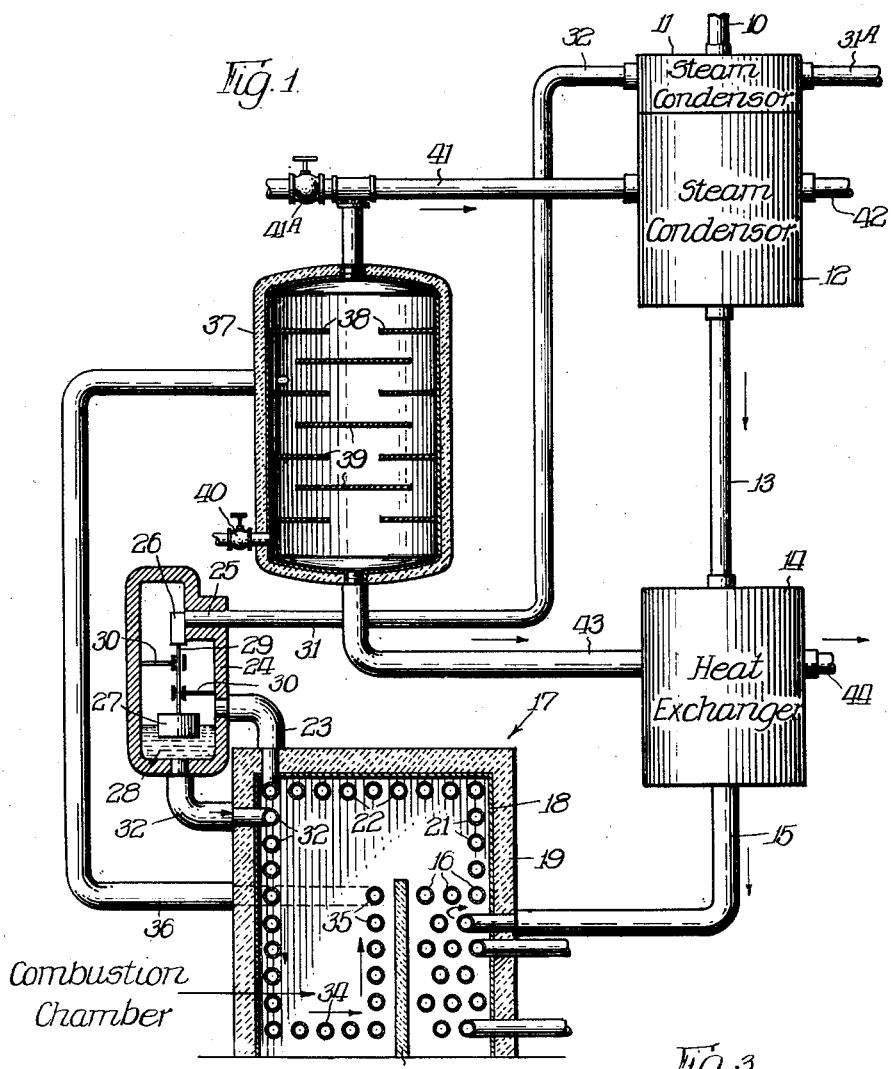

Oct. 18, 1932.   R. E. WILSON   1,883,211
CONCENTRATION OF CAUSTIC SODA
Filed Oct. 20, 1930

Inventor:
Robert E. Wilson,
By Bruce K. Brown atty

Patented Oct. 18, 1932

1,883,211

UNITED STATES PATENT OFFICE

ROBERT E. WILSON, OF CHICAGO, ILLINOIS, ASSIGNOR TO STANDARD OIL COMPANY (INDIANA), OF CHICAGO, ILLINOIS, A CORPORATION OF INDIANA

CONCENTRATION OF CAUSTIC SODA

Application filed October 20, 1930. Serial No. 489,969.

This invention relates to the concentration of aqueous liquids and it pertains more particularly to a method and means for concentrating solutions of caustic, such as sodium hydroxide.

The removal of the last part of the water from caustic solutions is a serious problem, both because of the corrosive action on the caustic pots and because of the tenacity with which this water is held by the sodium hydroxide. The object of this invention is to concentrate caustic soda in a continuous, efficient, direct fired, "resistant" system (the term "resistant" is used herein to include resistance to corrosion, to embrittlement and to other causes of weakness). A further object is to provide an apparatus which will minimize the necessity of repair and replacement, which will effectively separate water from highly concentrated solutions, and which can be easily operated and controlled. Other objects will be apparent from the following detailed description of my invention.

The invention contemplates the use of a direct-fired pipe still equipped with resistant tubes and headers, and with traps and/or flash drums made of or lined with resistant metal such as nickel or high nickel alloys. The caustic solution is rapidly passed through the pipe still coils and supplied with sufficient heat to remove substantially all of the water by the time the solution is discharged from the final separator chamber.

Figure 2:
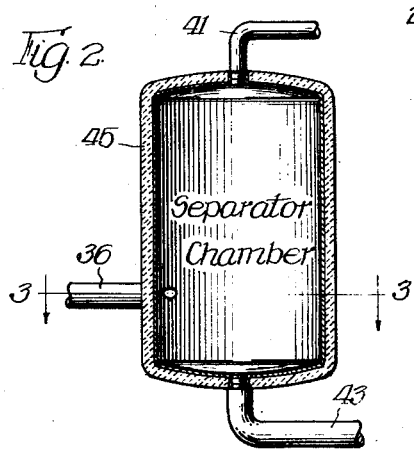
Figure 3:
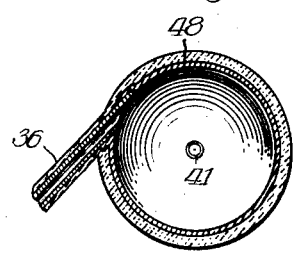

In the accompanying drawing wherein similar parts are designated by like reference characters in the several views:

Fig. 1 is a diagrammatic sectional elevation of an apparatus embodying a preferred form of my invention, Fig. 2 is a vertical section of a modified separator chamber, and Fig. 3 is a horizontal section taken through line 3—3 of Fig. 2.

The solution to be evaporated is preferably one which has been partially concentrated and freed of carbonates and carbon dioxide; otherwise sodium carbonate monohydrate scale may collect on the walls of the apparatus or salt crystals may come down and clog the pipes. The carbonates may be removed by a preliminary concentration to about a 50% solution in vertical tube evaporators or a 70% solution in forced circulation evaporators, which are efficient means for driving out water up to these concentrations but which cannot be used for removing the last portions of the water. Instead of using the preliminary concentration to remove carbonates, they may be removed by conventional chemical methods. The solution should also be free from elemental or combined sulfur.

The purified caustic solution, which may be already concentrated to about 50% or 70%, is conducted through pipe 10, steam condenser 11, steam condenser 12, pipe 13, heat exchanger 14, and pipe 15 to resistant tubes 16 at the top of the convection chamber in pipe still 17. The lower coils or tubes of the convection chamber may be used for preheating the caustic solution, but since the heat transfer to the tubes is relatively small I prefer to use this section for generating steam. These tubes may therefore be made of ordinary steel and they may be connected with a power plant.

Pipe still 17 is enclosed in a steel shell 18 protected by suitable insulating material 19, such as fire brick, and it is divided by baffle 20 into a convection chamber and a combustion chamber, as shown in Fig. 1.

The caustic solution is rapidly passed through convection tubes 16, wall tubes 21 and roof tubes 22 wherein the temperature is rapidly raised. As the temperature increases large amounts of steam will be formed thereby setting up a high back pressure which, if not released, may equal or even exceed the pressures developed by the pumps (not shown) which force the solution into pipe 10. In order to remove the steam from the system and avoid back pressure I conduct the hot caustic-steam mixture through pipe 23 to trap 24. In the upper part of this trap I provide a vapor outlet 25, the opening of which is regulated by a valve 26 actuated by float 27 in accordance with the level of liquid 28 in the trap. Any suitable mechanism may be employed for connecting the float with the valve and I have shown, by way of example, a reciprocating rod 29 journaled in brackets 30.

In practice the trap will usually be of the horizontal type with the float mounted at the end of a lever, the valve stem or actuating device being pivoted to said lever near the point at which the lever is pivoted to its fulcrum. Steam leaves the top of the trap through pipe 31, is condensed in condenser 11, and is finally discharged through the pipe 31A.

The liquid caustic freed from the steam is returned to the furnace by pipe 32 and is circulated through wall tubes 33, hearth tubes 34 and baffle tubes 35 to discharge tube 36 which conducts the hot mixture to separating chamber 37.

The separating chamber may be a cylindrical vessel lined with resistant metal or alloy and provided with upper baffles 38 for preventing entrainment and lower baffles 39 for effectively stripping the liquid by means of an inert gas, such as nitrogen, which may be introduced at the base of the separator through pipe 40. The steam and stripping medium are conducted from the top of the separator by pipe 41 to steam condenser 12 which is provided with outlet pipe 42. All or part of the stripping medium may be withdrawn from pipe 41 through valve 41A, heated by suitable means (not shown) and re-introduced through pipe 40 for recirculation.

The fused caustic is withdrawn from the bottom of separator 37 through pipe 43, heat exchanger 14 and pipe 44 to suitable molds.

Instead of using a baffle separator I may use an open cylindrical separator 45 as shown in Figures 2 and 3. In this case I prefer to introduce the mixture of steam and hot caustic tangentially so that steam may be separated with a minimum of entrainment.

All pipes and/or surfaces with which the hot caustic solutions and/or fused caustic come in contact should be made of resistant material. I prefer to make tubes 15, 16, 21, 22, 23, 33, 34, 35, 36 and 43 of nickel or a high nickel alloy such as Monel metal, which contains about 61½% nickel, 33% copper and 6½% iron. The heater tubes may be coated with chromium or other suitable plate for resisting furnace gases, etc. The heat exchanger 14, steam trap 24 and separator 38 should be made of or lined with a heat resistant metal of nickel or nickel alloy.

The exchanger, pipe still, trap, separator and pipes connecting these elements should, of course, be thoroughly insulated with asbestos or other suitable material.

While I have shown a single trap in my preferred embodiment it is understood that I do not limit myself to this construction. I contemplate the use of as many traps as may be necessary to maintain steam velocities, volumes and pressures at the desired values.

It should be noted that upper journal 30 prevents the float 27 from sealing pipe 32 so that liquid flow is never obstructed through the furnace. Sliding valve 26 prevents any liquid from being bypassed through pipe 31.

Instead of condensing steam in condensers 11 and 12, I may use the steam in my preliminary concentrators hereinabove mentioned.

The final temperatures required will depend upon the nature of the desired end product and the amount of reboiling or stripping employed. The term "substantially anhydrous", as used in the appended claims, refers to caustic containing as much as one-half percent of water. The term "anhydrous" signifies the removal of all but traces of water. I may obtain the substantially anhydrous caustic by heating the caustic solution to an outlet temperature of about 750° F., especially if the separation is augmented by a suitable stripping medium, such as nitrogen gas introduced through pipe 40 at a temperature near or somewhat above that of the caustic. While steam is not an ideal stripping medium for this purpose, I may introduce hot steam through pipe 40, but in this case it should be superheated to a temperature of about 1000° or 1100° F.

To prepare absolutely anhydrous caustic it may be necessary to heat the caustic to a final temperature of about 900° to 1200° F. and to strip the fused liquid in the separator with large volumes of nitrogen at about the same temperature.

The fused sodium hydroxide withdrawn through pipe 43 and heat exchanger 14 must be maintained at a temperature above its fusion point which is about 600° to 620° F.; otherwise it may solidify and choke up the system.

In some cases it may be desirable to add a little sulfur to improve the color of the caustic before it cools below 750° or 800° F., this operation preferably being carried out in iron vessels.

Caustic solutions, particularly those which have been concentrated to 50% are corrosive, and the cast iron pots which have heretofore been used for the final concentration required frequent repair and replacement. Nickel on the other hand is not unfavorably affected by pure concentrated caustic soda solutions above fusion temperature (in the absence of sulfur). My improved apparatus will therefore not require the frequent repairs and replacements which have heretofore been necessary.

Furthermore, the removal of the water is almost instantaneous. I effectively accomplish in a simple, inexpensive and continuous manner that which has heretofore required a laborious, expensive evaporation in an open pan. While I have described in detail a preferred embodiment of my invention it is understood that I do not limit myself to these details except as defined by the following claims.

I claim:

1. Method of concentrating a caustic solution which comprises heating the solution to a temperature of about 750° F. in a closed conduit, introducing the hot fluid into a separator chamber and sweeping hot caustic with an inert gas for removing further amounts of water therefrom.

2. The method of concentrating caustic soda which comprises heating the solution in resistant tubes, relieving the pressure in said tubes by trapping out the steam formed therein and stripping the hot substantially anhydrous caustic with a hot inert gas.

3. The method of preparing substantially anhydrous caustic soda which comprises heating an aqueous solution of caustic soda in resistant pipe still tubes to liberate steam, trapping out said steam, raising the temperature of the solution in the tubes to about 750° F., and separating the substantially anhydrous caustic leaving the pipe still from the steam which is mixed therewith.

4. The method of preparing substantially anhydrous caustic soda which comprises heating an aqueous solution of caustic soda in resistant pipe still tubes to liberate steam, trapping out said steam, raising the temperature of the solution in the tubes to about 750° F., separating the substantially anhydrous caustic leaving the pipe stills from the steam which is mixed therewith, and stripping said substantially anhydrous caustic with a hot inert gas to sweep out further amounts of water.

5. The method of preparing substantially anhydrous caustic soda which comprises heating an aqueous solution of caustic soda in resistant pipe still tubes to liberate steam, raising the temperature of the solution in the tubes to about 750° F., and separating the substantially anhydrous caustic leaving the pipe still from the steam which is mixed therewith.

6. The method of claim 5 wherein the resistant tubes are lined with a metal comprising nickel so that the corrosive effect of the caustic solution will be reduced to a minimum.

Signed this 15th day of October, 1930, at Chicago, county of Cook, State of Illinois.

ROBERT E. WILSON.